A. O. BURGESS.
SAFETY CATCH FOR JEWELRY.
APPLICATION FILED FEB. 13, 1909.

927,827.

Patented July 13, 1909.

WITNESSES:
E. A. Pell
M. A. Johnson

INVENTOR
Andrew O. Burgess,
BY
Wm. H. Canfield
ATTORNEYS

UNITED STATES PATENT OFFICE.

ANDREW O. BURGESS, OF NEWARK, NEW JERSEY.

SAFETY-CATCH FOR JEWELRY.

No. 927,827.  Specification of Letters Patent.  Patented July 13, 1909.

Application filed February 13, 1909. Serial No. 477,802.

*To all whom it may concern:*

Be it known that I, ANDREW O. BURGESS, a subject of the King of Sweden, residing at Newark, in the county of Essex and State of New Jersey, have invented certain new and useful Improvements in Safety-Catches for Jewelry; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a safety catch which is designed to secure the end of a pin which is usually pivoted or secured by a spring action to the back of a piece of jewelry.

The device consists of a hook through the opening of which the pin is adapted to pass in and out, and the device embodies a ring which is arranged on the inner face of the hook and is adapted to be rotated, whereby an opening in the ring is brought in register with the opening in the hook to permit the passage of the pin, or it is swung around so as to close this opening in the hook, whereby the openings in the hook and in the ring are out of register. The inner ring is operated manually to be locked and unlocked, and the ring can be swung inward, to a slight extent, so that one end can be formed into a catch to engage the hook so that the ring can be locked in its position when it is closing the hook.

The invention is illustrated in the accompanying drawing, in which—

Figure 1:
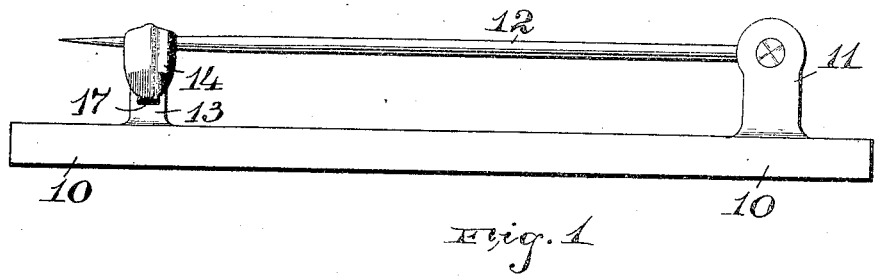
Figure 2:
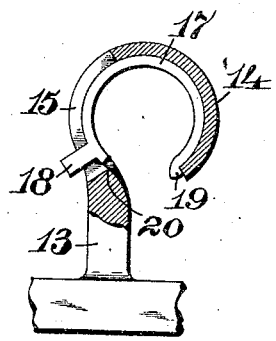
Figure 3:
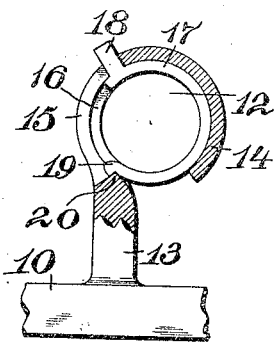
Figure 4:
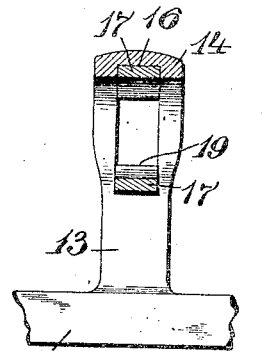
Figure 5:
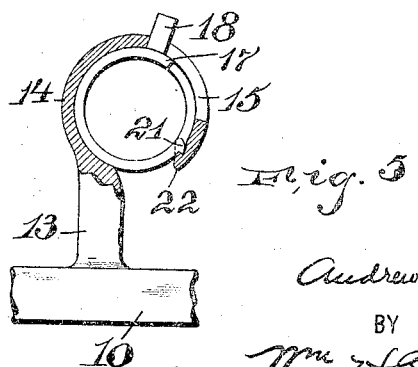

Figure 1 is a side view showing a pin and a catch of my improved construction. Fig. 2 is a detail of the catch in its open position, and Fig. 3 is a similar view with the catch closed. Fig. 4 is a vertical section through Fig. 3. Fig. 5 is a view similar to Fig. 3, but of a slightly modified form of construction.

I may apply this device to any form of jewelry employing a pin to fasten it, and I illustrate a body portion 10 having a standard 11 in which is pivoted the pin 12 so that it can be swung, after it is inserted in a garment, so that it can pass under the hook to prevent the accidental withdrawal of the pin. The hook to receive the pin comprises a stem 13 which is bent into a hook 14, the metal being preferably flattened and made a little wider so as to give a larger surface, although this particular configuration is not absolutely necessary. The hook is slotted as at 15 and is provided on its inner face with a groove 16. A ring 17 is placed in the groove and is adapted to be rotated therein, the ring having an opening which is adapted to be placed in and out of register with the opening in the hook, according to the way the ring is swung. The ring is operated by a stud 18 which projects out through the slot 15 and provides means for its manual manipulation. The stud 18 can be placed anywhere in the ring, but is preferably placed near one end, which is the end opposite to the one which closes and opens the opening in the hook. The other end of the stem is provided with a nose 19 which is adapted to coöperate with the hook when they are swung so as to close the opening in the hook and lock the ring in its closed position.

In Figs. 2 and 3 are illustrated the two positions of the hook 19 and the edge 20 with which it engages to lock the ring in its closed position. The nose 19 has a slight spring action due to the possibility of contracting the ring so as to allow it to slide over the edges 20. The views are exaggerated of course in size, and the hook in reality has but a slight edge so that a manual push on the stud 18 will dislodge the nose 19 and permit the opening of the hook, but enough of a projection is formed to prevent the accidental opening of the hook by the gradual slipping around of the ring which would occur, possibly, if there were no means for locking the rink shut.

In Fig. 5 is illustrated a modified form of construction in which the nose 21 is formed in one end of the ring, and the end of the hook is formed into a coöperating latch 22 so that the ring is locked in its closed position, due to the spring action both of the hook and the ring.

If desired, the slot 15 can be made of a length calculating to limit the movement of the ring in each direction as in Fig. 5.

The particular form and design of hook and ring are not essential, and I desire to be understood as not limiting myself to the particular formation and proportion of the parts described and illustrated herein.

Having thus described my invention, what I claim is:—

1. A safety catch comprising a hook having a slot therein and having a groove on its inner face, a ring rotatably arranged in the groove and having an opening to be placed in or out of register with the opening in the hook as the ring is rotated, and a stud on the ring projecting through the slot in the hook and providing for the manual manipulation of the ring.

2. A safety catch comprising a hook, the hook having a groove on its inner face, a ring rotatably arranged in the groove, the ring having an opening adapted to be placed in and out of register with the opening in the hook, the ring having a spring action whereby it can be contracted, a nose on one end of the ring adapted to engage an edge of the hook by its spring action, and means for manually manipulating the ring.

3. A safety catch comprising a hook having a slot therein and having a groove on its inner face, a ring adapted to fit the groove and be rotatably arranged therein with its inner face flush with the inner face of the hook, a stud on the ring projecting through the slot in the hook, the ring having an opening to be placed in or out of register with the opening in the hook as the ring is manipulated by the stud, and a nose on the end of the ring adapted to engage the hook to form a latch for locking the ring in its closed position.

In testimony, that I claim the foregoing, I have hereunto set my hand this 11th day of February, 1909.

ANDREW O. BURGESS.

Witnesses:
WM. H. CAMFIELD,
E. A. PELL.